United States Patent

Rowe et al.

[11] 3,908,855
[45] Sept. 30, 1975

[54] BAIL RECEIVER FOR PLASTIC CONTAINERS

[75] Inventors: Edgar R. Rowe, Cleveland; Robert R. Terlop, Brookpark, both of Ohio

[73] Assignee: Van Dorn Company, Cleveland, Ohio

[22] Filed: May 17, 1974

[21] Appl. No.: 470,916

Related U.S. Application Data

[62] Division of Ser. No. 272,766, July 18, 1972, Pat. No. 3,831,798.

[52] U.S. Cl. .................................................. 220/91
[51] Int. Cl.² ........................................ B65D 25/32
[58] Field of Search ............. 220/91, 95; 150/.5, 48; 215/100 A

[56] References Cited
UNITED STATES PATENTS

| | | | |
|---|---|---|---|
| 3,425,471 | 2/1969 | Yates, Jr. ...................... | 220/91 UX |
| 3,516,571 | 6/1970 | Roper et al. ..................... | 150/.5 X |

FOREIGN PATENTS OR APPLICATIONS

| | | | |
|---|---|---|---|
| 1,142,575 | 4/1957 | France .................................. | 150/48 |

*Primary Examiner*—George T. Hall
*Attorney, Agent, or Firm*—Meyer, Tilberry & Body

[57] ABSTRACT

A bail receiver is provided on the outer surface of the sidewall of a plastic container. The receiver is integral with the sidewall and includes a plate portion spaced outwardly from the sidewall and provided with a circular aperture to receive the end of a bail by which the container is adapted to be supported in suspension. The plate has a bottom edge spaced from the aperture, and a slot narrower in width than the cross-sectional dimension of the bail end extends from the bottom edge to the aperture. The slot guides movement of the bail end into the aperture and retains the bail end in the aperture against unintentional displacement through the slot.

4 Claims, 11 Drawing Figures

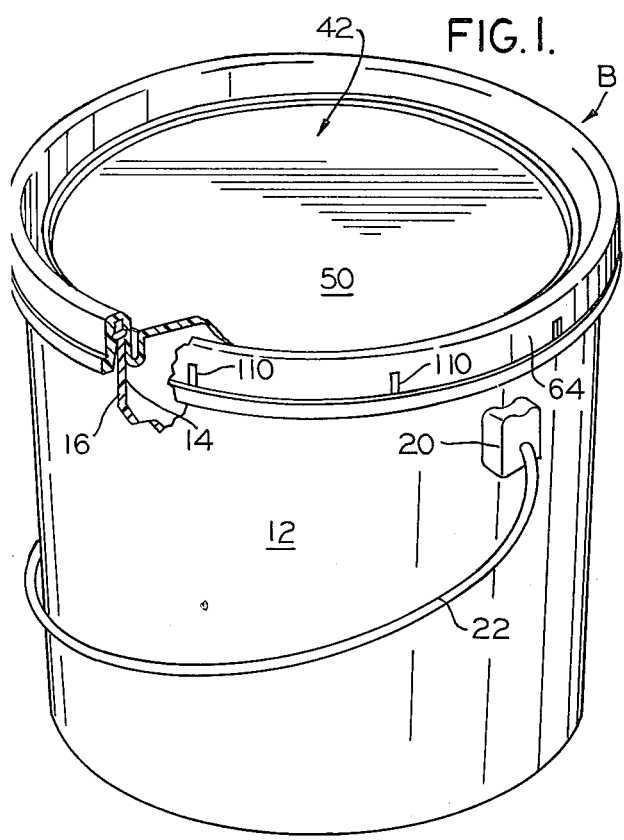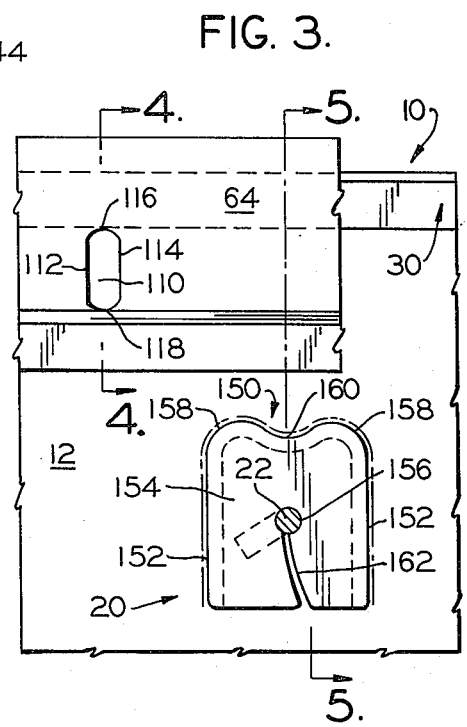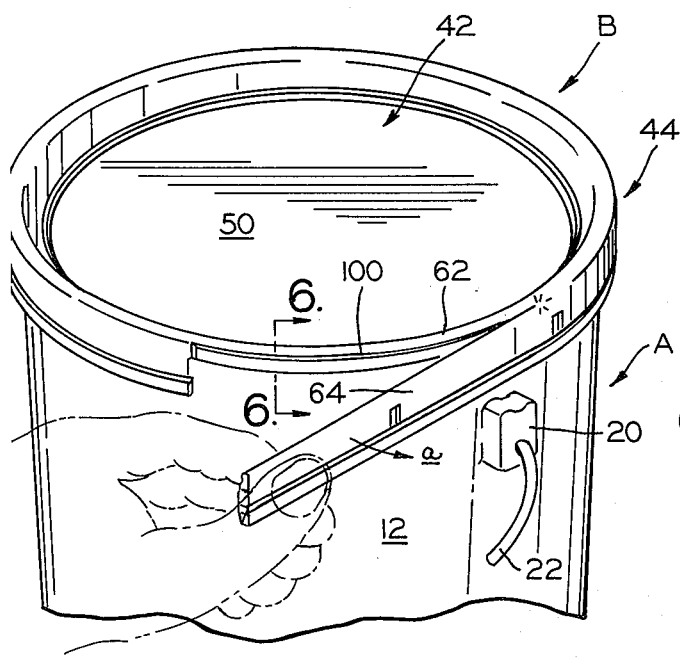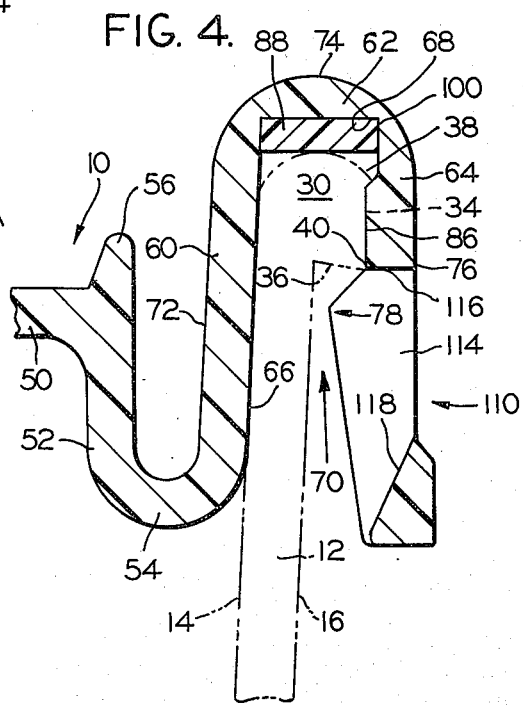

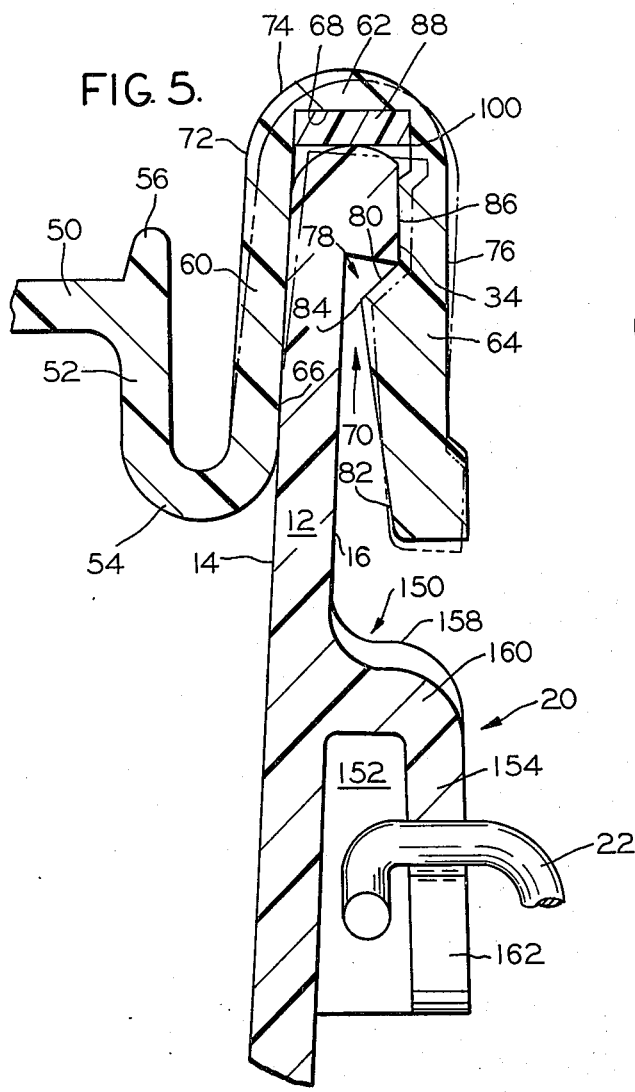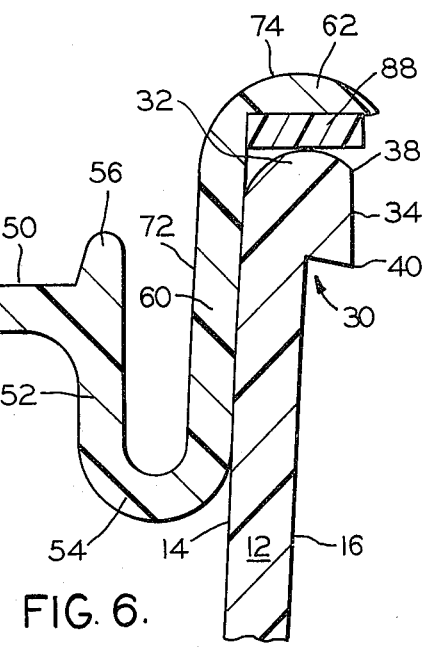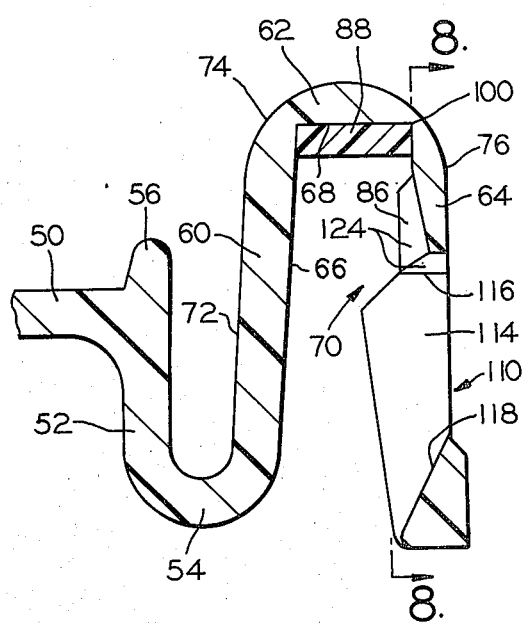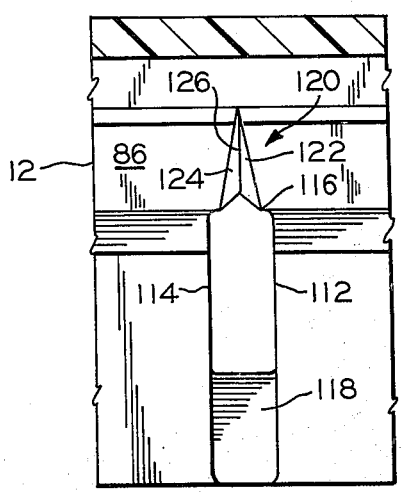

BAIL RECEIVER FOR PLASTIC CONTAINERS

This is a division of application Ser. No. 272,766 filed July 18, 1972, now U.S. Pat. No. 3,831,798 issued Aug. 27, 1974.

This application pertains to the art of containers and more particularly to pail type containers for liquids or the like.

The invention is particularly applicable to a sealing lid construction for use with pair type containers in which a liquid tight seal is required between a lid and an associated pail and will be described with particular reference thereto; however, it will be appreciated that the invention is capable of broader applications which will be apparent to those skilled in the art.

The use of molded plastic pail type containers has steadily increased with the development of integrally molded lid supporting and sealing bead structures disposed adjacent the open end of the containers capable of sealingly supporting a lid structure in a close fitting sealing relationship therewith. Various designs of these lid supporting and sealing beads are currently in use and which all present substantially similar problems which the subject invention is designed to overcome. With the advent of the molded plastic pails, there have also been several attempts at providing associated molded plastic lids for use therewith. However, inasmuch as the lid supporting and sealing beads include some sort of sealing lip or flange, the lid structures must also necessarily include a corresponding flange or lip to lockingly engage the sealing bead. Thus, the most common arrangements require that the lid include a peripherally extending bead receiving groove comprised of at least a top wall generally parallel to the lid surface and an outer wall generally normal to the lid surface wherein the outer wall includes an inwardly extending lip for engagement with the lid supporting and sealing bead when the lid is ultimately placed over the container itself. The resilient nature of the receiving groove maintains the lid in its sealing relationship with the container and has proved substantially satisfactory for maintaining the lid in its sealing position; however, it has been substantially unsatisfactory when it is desired to remove the lid from its sealing relationship with the container. Because the sealing groove is defined by at least continuous peripherally extending top and outer walls, the prior lids have been extremely difficult to remove from a close-fitting container sealing relationship when the containers are full of liquid or other type of material.

Heretofore, it has been necessary to undesirably pry the lids from their sealing relationship which, when the containers were full, presented the distinct possibility that there would be undesirable material spillage. Another prior approach to lid removal has been to cut or otherwise destroy the lid in order that it may be removed from its sealing relationship with the container. This, of course, has had the undesirable effect of destroying the lid so that once the contents of the container were emptied, the lid and container combination could not be re-used. Thus, the molded plastic container sealing lids of the type hereinabove described have not as yet proved entirely satisfactory or acceptable for one or more of the reasons hereinabove discussed.

The present invention contemplates a new and improved article which overcomes all of the above referred problems and others and provides a new container sealing lid which is simple in design, economical to manufacture, provides a good sealing relationship with an associated container, is easily removable from a container sealing relationship when desired and is reusable.

In accordance with the present invention, there is provided a plastic container sealing lid adapted to sealingly close a container of the type having an open top end and a lid supporting and sealing outwardly protruding bead adjacent thereto. The lid comprises a generally flat lid surface generally dimensioned so as to substantially cover the open top end. A supporting and sealing bead receiving groove extends peripherally around the lid surface and is adapted for a close-fitting sealing engagement with at least the sealing bead. The bead receiving groove includes a first inner wall, a top wall and a second outer wall each having inner and outer peripheral surfaces and which define the receiving groove as being generally U-shaped. Means are provided in the groove for permitting selective removal of at least a part of the second outer wall from the lid and for allowing the lid to be removed from its close fitting sealing engagement with the container.

In accordance with another aspect of the present invention, the removal means comprises an area of reduced thickness in one of the walls extending substantially peripherally around the lid.

In accordance with another aspect of the present invention, there is provided means for initiating selective removal of at least a part of the outer wall.

In accordance with still another aspect of the present invention, there is provided an improvement in a molded plastic container sealing lid of the type adapted to be employed with a container having an open end and a lid supporting and sealing bead extending therearound adjacent the open end and wherein the lid includes a lid supporting and sealing bead receiving groove comprised of at least a top wall generally parallel to the lid and an outer wall extending generally normal to the top wall. The improvement comprises including removal means in the lid in order that at least a part of the outer wall may be selectively removed from its connection to the lid.

In accordance with yet another aspect of the present invention, there is provided an improved container bail receiver of the type integrally molded with a plastic container wherein there is provided means for allowing a bail to be selectively inserted into the bail receiving means without requiring either the bail receiver or bail to be substantially temporarily deformed.

The principal object of the present invention is the provision of a new and improved molded plastic container sealing lid which permits ease of removal of the lid from a close-fitting sealing relationship with an associated container.

Another object of the present invention is the provision of a new and improved molded plastic container wherein the removal means are molded integrally into the container sealing lid.

Another object of the present invention is the provision of a new and improved molded plastic container wherein the integrally molded removal means are inexpensive to incorporate.

Another object of the present invention is the provision of a new and improved molded plastic container sealing lid which may be re-used after it has been removed from its sealing relationship with an associated container.

Still another object of the present invention is the provision of a new and improved molded plastic container sealing lid which provides a strong sealing relationship with an associated container until desired lid removal.

Still another object of the present invention is the provision of an improved lid removal means which may be incorporated into almost any type of molded plastic container sealing lid.

Yet another object of the present invention is the provision of an improved bail receiving means for use on molded plastic containers.

The invention may take physical form in certain parts and arrangements of parts, a preferred embodiment of which will be described in detail in this specification and illustrated in the accompanying drawings which form a part hereof and wherein:

FIG. 1 is a perspective view of a molded plastic pail type container and associated sealing lid which incorporates thereinto the concepts of the subject invention;

FIG. 2 is another perspective view showing the concepts of the subject invention and particularly showing how the removal means permits selective lid removal;

FIG. 3 is a partial side elevation of the container and sealing lid therefor showing particularly the outermost walls of the container and container sealing lid;

FIG. 4 is a cross sectional view taken through lines 4—4 in FIG. 3;

FIG. 5 is a cross sectional view taken along lines 5—5 in FIG. 3;

FIG. 6 is a cross sectional view taken along lines 6—6 of FIG. 2;

FIG. 7 is a cross sectional view similar to FIG. 4 with the sealing lid removed from association with the container;

FIG. 8 is a rear view in the direction of lines 8—8 in FIG. 7 showing the inside of the outer wall;

Figure 9:
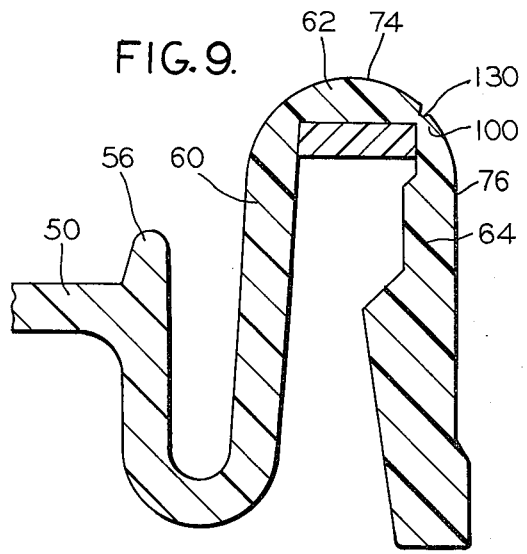
FIG. 9 is another arrangement of the lid which incorporates the concepts of the subject invention.

Referring now to the drawings wherein the showings are for purposes of illustrating preferred embodiments of the invention only and not for purposes of limiting same, the FIGURES show a molded plastic pail type container A having disposed thereon a pail sealing lid B.

More specifically, pail A is molded preferably from polyethylene plastic and includes an open top end 10, a continuous peripheral side wall 12 having inner surface 14 and outer surface 16 and a bottom wall 18. Integrally molded with side wall 12 are a pair of identical bail receivers 20 which support a conventional bail member 22.

As best shown in FIGS. 3, 4 and 6, the pail includes an integrally molded lid supporting and sealing bead 30 extending peripherally around and adjacent open top end 10. This bead includes an upper or top curvilinear surface 32, an outwardly facing surface 34 and a bottom or lower surface 36. Surfaces 32, 34 join to form an upper sealing edge 38 and surfaces 34, 36 join to form a resilient lid engaging sealing lip. It will be appreciated that bead 30 as hereinabove described is only exemplary and other variations thereof may be employed on a pail type container while not departing from the intent and scope of the subject invention.

Pail sealing lid B includes a covering surface 42 and a pail sealing zone 44. Covering surface 42 comprises a generally flat surface 50 in the preferred embodiment of the invention although it is not necessarily limited thereto. Extending peripherally around surface 50 and generally normal thereto is a sealing zone connecting wall 52 having disposed at the lowermost end thereof a curvilinear sealing zone connecting wall 54. Protruding upwardly from the peripheral edge of surface 50 is a reinforcement lip 56 which provides desired rigidity and strength to the overall pail sealing lid structure.

Sealing zone 44 is comprised of an inner wall 60 extending upwardly from wall 54 and generally normal to surface 50, a curvilinear top wall 62 extending generally parallel to surface 50 and an outer wall 64 extending generally normal to inner wall 60 and normal to surface 50. Walls 60, 62 and 64 include inner peripheral surfaces 66, 68 and 70 and outer peripheral surfaces 72, 74 and 76 respectively. Disposed in inner peripheral surface 70 of outer wall 64 is a bead engaging lip or protrusion 78 acts to engage lid supporting and sealing bead 30 as best shown in FIGS. 1 and 4. This protrusion is comprised of (FIG. 5) side surfaces 80, 82 converging to an apex 84. Outer wall 64 also includes as a part of inner peripheral surface 70 thereof, a surface 86 which is closely received against surface 34 as may be seen in both FIGS. 4 and 5. A sealant or gasket material 88 of any convenient type is desirably received in sealing zone 44 adjacent inner peripheral surface 68 of curvilinear top wall 62 to assure a liquid tight sealing relationship between the lid and container.

In the preferred embodiment of the present container sealing lid, there is included a severing area or zone 100 disposed at the juncture between curvilinear top wall 62 and outer wall 64. As best seen in FIGS. 4 and 7, area 100 is shown as having a lesser thickness than the corresponding area between inner wall 60 and curvilinear top wall 62 or the wall thicknesses themselves. Because area 100 is of lesser thickness, it will be the first to yield or tear under proper pressure as will hereinafter be more fully described. It should here be noted that in the preferred embodiment of the subject invention, the pail sealing lid is molded from a high density polyethylene plastic having a density of 0.95–0.96 and a melt index of 0.5–6.0. It will be appreciated, however, that other plastic materials such as polypropylene or polyvinyl chloride could be readily employed without departing from the intent and scope of the subject invention. The high density polyethylene as hereinabove described has a physical characteristic known as "notch sensitivity." This sensitivity characteristic merely means that the plastic has a tendency to fracture at a point where two surfaces converge together at an angle to each other. This "notch sensitivity" is put to practical use in the subject invention by having inner wall surface 68, 70 coming together and joining at area 100 at substantially a right angle. Other arrangements, however, may also be employed as will hereinafter be more fully described. The notch sensitivity thus created at area 100 permits outer walls 64 to be torn from its connection with curvilinear top wall 62 in order to release the sealing relationship between the sealing lid B and the container A when desired and as will hereinafter be more fully explained.

Disposed in outer wall 64 are a plurality of separation initiating openings generally designated 110 (FIGS. 1, 2, 3 and 4). In the preferred embodiment, each of these openings includes a pair of elongated opposed side walls 112, 114, a top wall 116 and a bottom wall 118. It should be particularly noted, and as best shown in FIG. 4, that each opening 110 increase in area from its dimension at outer peripheral surface 76 to its dimension at inner peripheral surface 70.

With reference to FIGS. 7 and 8, each of the openings is shown as further including a notch 120 extending therethrough in top wall 116 with the apex thereof generally directed toward area 100. Each of these notches includes a pair of side walls 122, 124 converging to an apex 126. With particular reference to the FIGURES, it will be noted that each notch 120 also substantially increases in area as it extends through outer wall 64 from outer peripheral surface 76 toward inner peripheral surface 70. The converging of side walls 122, 124 at an angle to each other again brings the "notch sensitivity" as hereinabove discussed into play in the use of the separation initiating openings 110 as will hereinafter be more fully described.

At the place of filling pail type container A with liquid or other material, the container sealing lid B is positioned around open top end 10 with sealing groove 44 disposed immediately above lid supporting and sealing bead 30. In this position, a downward force is exerted against the lid so that sealing zone 44 is forced over lid supporting and sealing bead 30 until bead engaging lip or protrusion 78 is received over and beneath lid engaging sealing lip 40. In this position, lid B is in a close fitting sealing relationship with container A. As shown in phantom in FIG. 5, during the fitting of lid B onto container A, inner wall 60 is resiliently forced inwardly toward covering surface 42 in order that a biasing force will be applied against inner peripheral surface 14 of the container by inner wall 60 while the lid is in its sealing position. Heretofore, and with the lid in its sealing position, it has been very difficult to remove the lid without completely destroying it or effecting spillage of some of the contents of the container. The primary reason for this is that since the lid supporting and sealing bead 30 and sealing zone 44 extend continuously around the container, the entire outer wall 64 must be forced outwardly in order to permit bead engaging lip or protrusions 78 to be released from engagement beneath lid engaging sealing lip 40. To overcome this problem, openings somewhat similar to openings 110 and having substantially a constant dimension were provided in outer wall 64. Thus, to remove the lid, outer wall 64 was cut transversely therealong, from the lowermost edge thereof, through these openings and to the juncture of outer wall 64 and top wall 62. Once this was done, the outer wall had been transformed into a plurality of sections which could, in turn, be forced outwardly from the container engaging position so as to permit removal of the lid. However, this approach also required extra undesirable effort and did not guarantee satisfactory lid removal results.

According to the present invention and as hereinabove described, these problems are entirely eliminated. Thus, with lid B in its sealing relationship with container A, it is only necessary to cut by any convenient means into the outer wall at one of a single opening 110, for example, generally along the dashed line shown in FIG. 8. Once this cut has been made, it is then merely necessary for the person opening the container to pull angularly outward on one side of the cut and, because of the lid material "notch sensitivity" that person is easily able to tear the outer wall from the top of opening 110 through the associated notch 120 to area 100. Although somewhat more difficult, the openings 110 of FIGS. 1–4 and which do not include notches 120 may also be torn as hereinabove described. In either situation, once outer wall 64 has been severed to area 100, and as shown in FIG. 2, it is only necessary to pull outwardly on outer wall 64 in order to "tear" it from its connected condition with top wall 62 through area 100. Again, this is permitted by the "notch sensitivity" of the material which comprises lid B. In the normal course of opening the container, all of wall 64 is removed from the lid. Since top wall 62 remains affixed to the lid structure, once the contents of the container are removed therefrom, the container and lid are reusuable although the lid may not be replaced in its original closely fitting sealing relationship relative to the container. Thus, the prior difficulty in opening the type of molded plastic pail type container as hereinabove described has been effectively eliminated.

Figure 10:
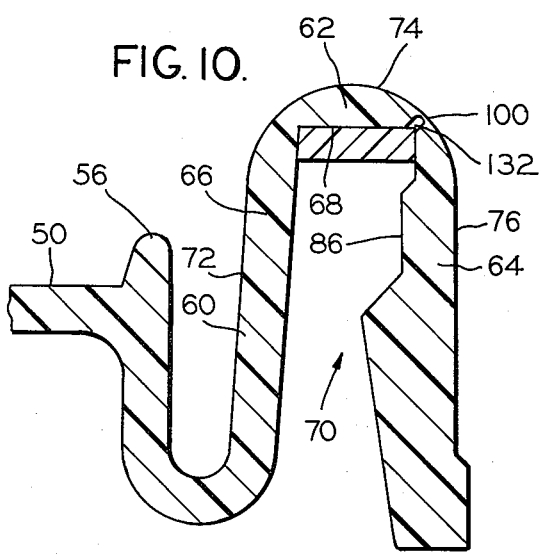
FIG. 10 is still another arrangement of the lid which incorporates the concepts of the subject invention.
Figure 11:
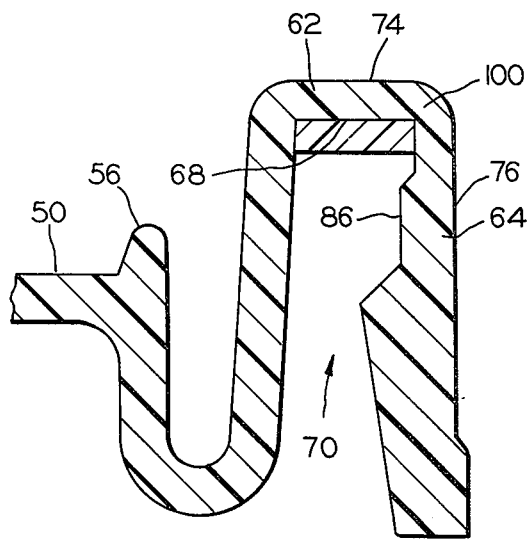
FIG. 11 is yet another arrangement of a lid incorporating thereinto the concepts of the subject invention.

Although the preferred embodiment of the invention shows severence area or zone 100 as being formed by the continuous right angle intersection of inner peripheral surfaces 68, 70, it will be appreciated that other arrangement may be readily employed as will hereinafter be described. For example, and with reference to FIG. 9, a right angled notch 130 could be molded into the juncture of outer peripheral walls 74, 76 at area 100 to again create an area of reduced thickness and thus permit outer wall removal similar to that hereinabove described. Likewise, and as shown in FIG. 10, other cross sectional configurations of notches such as, for example, a U-shaped notch 132 extending outwardly from surfaces 68, 70 could also be employed with similar results. In this instance, however, the notch sensitivity is not as pronounced so that tearing may be made slightly more difficult along area 100. Finally, if it is desired to retain the same thickness between the inner and outer peripheral surfaces of walls 62, 64, it is possible to achieve satisfactory results by merely assuring that inner peripheral surfaces 68, 70 are joined together and substantially a right angle while retaining substantially the same wall thickness over the entire receiving zone area. As shown in FIG. 11, this permits the walls to have thickness for purposes of making the lid strong while incorporating means to take advantage of the notch sensitivity characteristics to permit easy removal of the outer wall from the lid when desired.

Referring now to FIGS. 1, 2, 3 and 5, attention is invited to the specific structure of bail receiver 20 shown therein. It will be appreciated that there are two identical bail receivers and description will hereinafter be made with reference to one of these receivers, it being understood that the other is identical thereto unless otherwise specifically noted. Receiver 20 is integrally molded with container A and is generally of a hollow box-like configuration to include a closed end wall 150 nearest open end 10, side wall portions 152 extending outwardly from and running longitudinally along outer peripheral wall 16, and an outwardly facing receiver face 154 connecting walls 150, 152. Generally centrally located in receiver face 154 is a bail receiving recess or opening 156. Closed end wall 150 is curvilinear in nature and contains two end areas 158 which are more closely spaced toward open end 10 than a lower central area 160. The central area 160 is generally located directly above bail receiving recess 156.

In prior molded plastic pail constructions having similar bail receivers, it has been necessary to temporarily deflect or bend the end of the bails in order to insert them into receiving recesses. This has oftentimes proved difficult, time consuming and cumbersome. Therefore, in accordance with the subject invention, a slot 162 is provided in bail receiver face 154 to extend upwardly from the lowermost edge of face 154 to recess or opening 156. In the preferred embodiment of this arrangement, slot 162 is most desirably of a slightly smaller cross sectional dimension than the cross sectional dimension of bail member 22 and extends upwardly at an angle to face 154 to join the recess 156 at one of the lowermost corners thereof. Since the receiver face is of a resilient plastic material, the walls of slot 162 will be biased apart from each other as the bail is inserted therebetween and will resultantly prevent the bail from falling out of position from recess or opening 156. The angular disposition of slot 162 further aids in preventing the bail member from coming out of position from recess 156. It will be appreciated that other arrangements or angles other than that shown in the drawings and described hereinabove may be used without departing from the intent and scope of the subject application.

The invention has been described with reference to the preferred embodiment. Obviously, modifications and alterations will occur to others upon the reading and understanding of this specification. It is out intention to include all such modification and alterations insofar as they come within the scope of the appended claims or the equivalents thereof.

Having thus described our invention, we now claim:

1. In a plastic container of the type having an open end, a closed bottom wall, a side wall extending upwardly from said bottom wall and including inner and outer surfaces, and at least one bail receiver on said outer surface, said bail receiver including a plate portion spaced outwardly from said outer surface and having a top edge, a bottom edge and side edges and a continuous wall interconnecting said top and side edges with said outer surface of said container side wall, said plate portion having an aperture therethrough spaced from said top edge to receive a bail end, and said aperture having an upper portion engaged by said bail end when said container is supported in suspension by the bail, the improvement comprising: said continuous wall being undulated between said side edges of said plate portion, a slot in said plate portion for guiding said bail end into said aperture, said slot having an entrance end in said bottom edge of said plate portion and a second end opening into said aperture at a location spaced from said upper portion thereof, said slot having opposed side edges spaced apart along the length thereof from said entrance end to said second end, and at least the portions of said side edges of said slot at said second end being spaced apart a distance less than the cross-sectional dimension of said bail end.

2. The improvement according to claim 1, wherein said undulated portion of said continuous wall includes a central area and end areas with respect to said side edges of said plate portion, said central area being offset from said end areas toward said aperture.

3. The improvement according to claim 1, wherein said location at which said second end of said slot opens into said aperture is below said upper portion of said aperture, and said entrance end of said slot is offset from said second end in the direction toward one of said side edges of said plate portion.

4. The improvement according to claim 3, wherein said undulated portion of said continuous wall includes a central area and end areas with respect to said side edges of said plate portion, said central area being offset from said end areas toward said aperture.

* * * * *